W. BOEHLER.
SHAFT BEARING.
APPLICATION FILED SEPT. 15, 1914.
1,158,778.
Patented Nov. 2, 1915.
2 SHEETS—SHEET 1.
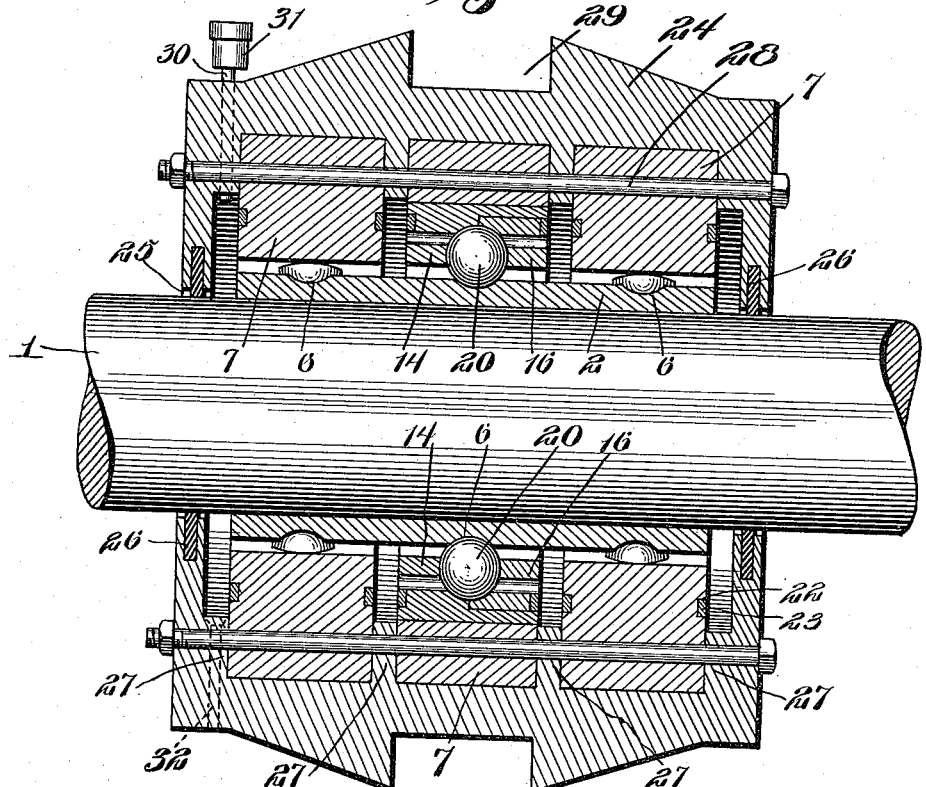
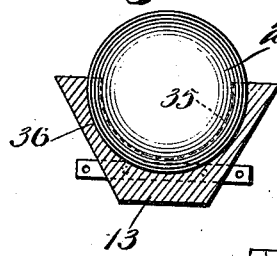
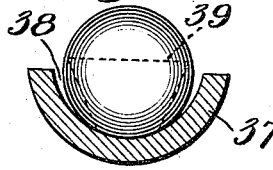
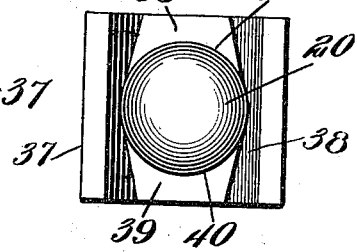
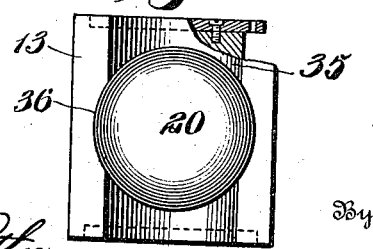
Witnesses
Inventor
*Wilhelm Boehler*
By *Victor J. Evans*
Attorney W. BOEHLER.
SHAFT BEARING.
APPLICATION FILED SEPT. 15, 1914.
1,158,778.
Patented Nov. 2, 1915.
2 SHEETS—SHEET 2.
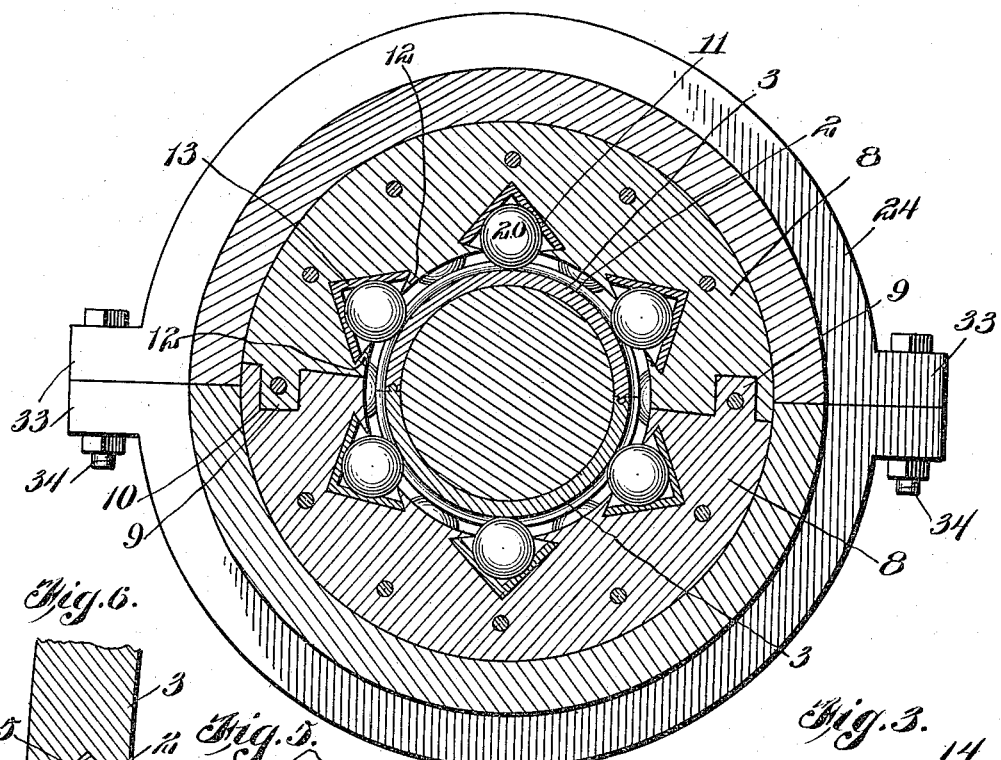
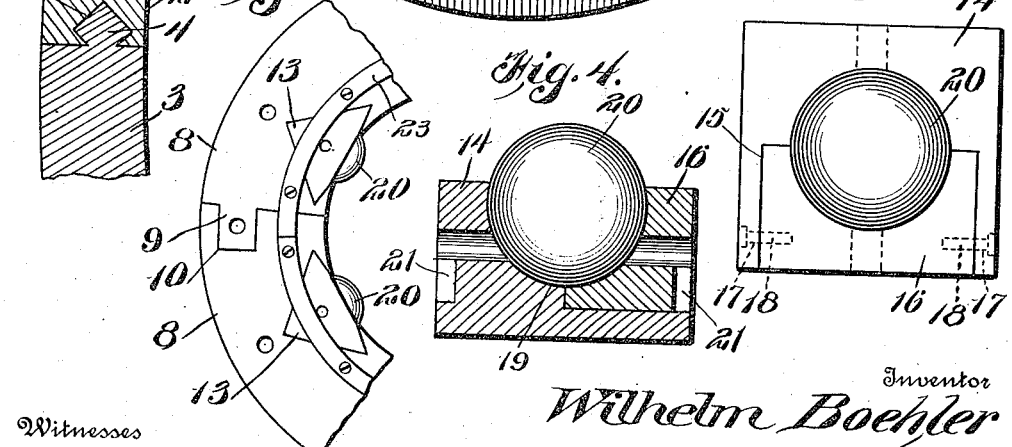
Witnesses
F. R. Heinrichs
J. J. McCarthy
Inventor
Wilhelm Boehler
By Victor J. Evans
Attorney

UNITED STATES PATENT OFFICE.

WILHELM BOEHLER, OF FORT WAYNE, INDIANA, ASSIGNOR TO LAWRENCE E. PONTIUS, OF COLUMBIA CITY, INDIANA.

SHAFT-BEARING.

1,158,778. Specification of Letters Patent. Patented Nov. 2, 1915.

Application filed September 15, 1914. Serial No. 861,852.

*To all whom it may concern:*

Be it known that I, WILHELM BOEHLER, a citizen of the United States of America, residing at Fort Wayne, in the county of Allen and State of Indiana, have invented new and useful Improvements in Shaft-Bearings, of which the following is a specification.

This invention relates to improvements in shaft bearings and has particular application to a suspended anti-friction bearing for line shafts.

In carrying out the present invention, it is my purpose to provide a shaft bearing whereby the line shaft will be supported in such manner that the same may rotate freely and with a minimum amount of friction.

It is also my purpose to provide a shaft bearing wherein friction between the moving parts will be reduced to a minimum and which will embody few parts and these so correlated and arranged as to practically eliminate the possibility of derangement.

A further object of my invention is to provide a shaft bearing wherein the anti-friction bodies will be so arranged as to distribute the weight of the shaft evenly over the bearing.

With the above and other objects in view, the invention consists in the construction, combination and arrangement of parts hereinafter set forth in and falling within the scope of the claims.

In the accompanying drawings, Figure 1 is a longitudinal sectional view through a shaft bearing constructed in accordance with the present invention, the same being shown as applied to a line shaft. Fig. 2 is a transverse sectional view through the bearing and shaft. Fig. 3 is a top plan view of one of the anti-friction bodies and the receptacle therefor. Fig. 4 is a longitudinal sectional view through the receptacle. Fig. 5 is a fragmentary side elevation of one of the retainers. Fig. 6 is a fragmentary sectional view through the bushing surrounding the shaft. Fig. 7 is a top plan view showing a modified form of the receptacle carrying the anti-friction body. Fig. 8 is a cross sectional view through such receptacle. Fig. 9 is a top plan view of a still further modified form of receptacle. Fig. 10 is a transverse sectional view through the receptacle shown in Fig. 9.

Referring now to the drawings in detail, 1 designates a line shaft, while 2 indicates a bushing or sleeve encircling the line shaft and constructed of brass or other wear resisting material. In the present instance, this sleeve is formed of two longitudinal sections 3, 3 and the longitudinal edges of one section are formed with longitudinally extending ribs 4 substantially diamond shaped in cross section and slidingly fitting within similarly shaped grooves 5 in the confronting edges of the remaining section, while formed in the outer face of the bushing 1 are annular ways 6 spaced apart along the length of the bushing equal distances.

Arranged about the shaft 1 and surrounding the bushing or sleeve 2 concentrically thereof are annular retainers 7 spaced apart equal distances along the length of the sleeve and corresponding in number with the number of grooves or ways 6 in the sleeves. In the present instance, the annular retainers are three in number and each comprises two semi-circular sections 8 each having one edge formed with a longitudinal rib 9 fitting into a longitudinal groove 10 formed in the remaining edge of the adjacent section. Formed in the inner edge of each retainer 7 are pockets 11 V-shape in cross dimensions and spaced apart equal distances about the shaft, the relatively large ends of the pockets opening onto the inner surface of the retainer. Formed on the inner walls of each pocket at the outer ends thereof are ribs 12 projecting toward each other and constituting stops or abutments, while slidably disposed within each pocket is a substantially V-shaped receptacle 13 having the outer ends of the walls thereof engaging the abutments formed by the ribs 12 so that inward movement of the receptacle is prevented.

In the present instance, each receptacle 13 comprises a section 14 V-shaped in cross section formed at one side of the transverse center line thereof with a substantially V-shaped recess 15, and a section 16 V-shaped in cross section and slidable into and out of the recess 15 in the section 14. The side walls of the recess 15 and the section 16 are formed with alining openings 17 through which are passed securing bolts 18 whereby the sections 14 and 16 of the receptacle are held in receptacle formation. The confronting edges of the sections 14 and 16 are cut out to form a semi-circular recess 19 designed to receive an anti-friction ball 20 and the depth of the recess 19 is slightly greater than one half the diameter of the anti-friction ball so that when the ball is within the recess and the sections assembled and secured together the walls of the recess will overlie the center of the ball and so hold the latter against displacement. The receptacles 13 are slid into the V-shaped pockets in the particular retainer and the ribs 12 hold the receptacles against inward movement, while the opposite edges of the receptacles are formed with grooves 21 alining with grooves 22 formed in the side edges of the retainer and with one another to receive securing rings 23, the rings 23 being disposed within the alining grooves and concentrically of the shaft so as to hold the receptacles within each retainer against sliding movement.

In assembling the parts, the balls 20 carried by each retainer are disposed within the adjacent groove or way 6 and are staggered relatively to the balls of the adjacent retainers so that the weight of the shaft is evenly distributed over the balls. Inclosing the annular retainer 7 is a cylindrical housing 24 having the opposite end walls thereof formed with alining openings 25 through which the shaft 1 passes. The walls of the openings 25 are formed with annular grooves and into the grooves are set rings 26 constructed of felt or similar material and having the inner edges thereof engaging the adjacent portions of the shaft to prevent the entrance of dirt, dust and foreign matter to the bearing. Formed on the inner wall of the casing 24 and extending into the same are annular flanges 27 spaced apart distances equal to the widths of the annular retainers 7 and disposed between the latter to hold the same spaced apart from each other and from the opposite end walls of the casing. Formed in the dividing flanges 27, the end walls of the casing 24 and the annular retainers 7 are alining openings through which are passed tie bolts 28 holding the retainers in proper relative positions within the casing, while formed in the outer surface of the casing 24 is an annular groove 29 designed to receive the hanger so that the bearing and shaft may be suspended. Leading into the casing 24 through the upper portion thereof is an oil tube 30 equipped at its upper end with an oil cup 31, while leading from the casing through the bottom portion thereof is an outlet tube 32 by means of which sediment and the like may be drawn from the casing. In the present instance, the casing 24 is formed of two longitudinal sections having the meeting edges thereof formed with outwardly extending abutting flanges 33 formed with alining bolt holes through which are passed securing bolts 34 whereby the sections are held in casing formation.

If desired, each retainer 13 may be formed from a single block of metal having the outer surfaces thereof cut to fit into the pockets in the retainer and formed with a longitudinal semi-circular groove 35 having the central portion of the wall thereof formed with a depression 36 designed to receive the ball 20, as clearly illustrated in Figs. 7 and 8, the depth of the depression being greater than one-half the diameter of the ball so as to hold the latter within the receptacle. The receptacles may be constructed as shown in Figs. 9 and 10 wherein each receptacle is illustrated as comprising a block of metal 37 having the outer surfaces thereof cut to fit into the pockets in the retainer and formed with a longitudinal semi-circular way 38. Formed integral with the block 37 at the opposite extremities of the way 38 and projecting into the latter are lugs 39 having the confronting faces thereof formed with concavities 40 designed to receive the ball 20, the recess formed by the concavities 40 being of a depth greater than one-half the diameter of the ball so that the lugs will effectively retain the latter.

From the foregoing description taken in connection with the accompanying drawings, the construction and manner of employing my improved shaft bearing will be readily apparent. It will be seen that I have provided a shaft bearing whereby the shaft is effectively supported and the weight of the shaft distributed evenly over the anti-friction bodies.

While I have herein shown and described certain preferred forms of my invention by way of illustration, I wish it to be understood that I do not limit or confine myself to the precise details of construction herein described and delineated, as modification and variation may be made within the scope of the claims without departing from the spirit of the invention.

I claim:

1. The combination with a shaft, of a bearing therefor comprising a number of retainers surrounding the shaft and spaced apart, balls carried by each retainer and spaced apart about the shaft equidistant and staggered relatively to the balls of the adjacent retainers, and a casing inclosing said retainers and having flanges formed on the inner walls thereof and disposed upon the opposite sides of the retainers therein to hold the latter spaced apart equal distances along the shaft.

2. The combination with a shaft, of a bearing therefor comprising a number of retainers surrounding the shaft and spaced apart, balls carried by each retainer and spaced apart about the shaft equidistant and staggered relatively to the balls of the adjacent retainers, a casing inclosing said retainers and having flanges formed on the inner wall thereof and disposed upon opposite sides of the retainers therein to hold the latter spaced apart along the shaft, and tie rods passed through the end walls of said casing and said flanges to hold the retainers in proper relative positions.

3. The combination with a shaft, of a bearing therefor comprising a number of retainers surrounding the shaft and spaced apart, balls carried by each retainer and spaced apart about the shaft equidistant and staggered relatively to the balls of the adjacent retainers, a casing inclosing said retainers and having flanges formed on the inner wall thereof and disposed upon opposite sides of the retainers therein to hold the latter spaced apart along the shaft, tie rods passed through the end walls of said casing and said flanges to hold the retainers in proper relative positions, and dust guards carried by the opposite end walls of said casing and surrounding the shaft to prevent the entrance of foreign matter to the bearings.

In testimony whereof I affix my signature in presence of two witnesses.

WILHELM BOEHLER.

Witnesses:
WILLIAM AUSTIN,
NELLIE POPE.